US012695736B2

(12) United States Patent
Trosten et al.

(10) Patent No.: US 12,695,736 B2
(45) Date of Patent: Jul. 28, 2026

(54) INTERFACE FOR A CORE PROCESS CONTROL SYSTEM

(71) Applicant: ABB Schweiz AG, Baden (CH)

(72) Inventors: Anders Trosten, Västerås (SE);
Magnus Wahlström, Västerås (SE);
Nils Vabulis, Västerås (SE); Magne Hansen, Eskilstuna (SE)

(73) Assignee: ABB SCHWEIZ AG, Baden (CH)

( * ) Notice: Subject to any disclaimer, the term of this patent is extended or adjusted under 35 U.S.C. 154(b) by 216 days.

(21) Appl. No.: 18/436,758

(22) Filed: Feb. 8, 2024

(65) Prior Publication Data

US 2024/0275771 A1      Aug. 15, 2024

(30) Foreign Application Priority Data

Feb. 15, 2023    (EP) ..................................... 23156691

(51) Int. Cl.
  *H04L 9/40*          (2022.01)
  *G05B 19/4155*       (2006.01)
(52) U.S. Cl.
  CPC .......... H04L 63/08 (2013.01); G05B 19/4155 (2013.01); H04L 63/107 (2013.01); H04L 63/123 (2013.01); *G05B 2219/31449* (2013.01)
(58) Field of Classification Search
  CPC ...... H04L 63/08; H04L 63/107; H04L 63/123
  See application file for complete search history.

(56) References Cited

U.S. PATENT DOCUMENTS

| | | | | |
|---|---|---|---|---|
| 11,477,547 | B1 * | 10/2022 | Abdelrazek | .............. H04L 67/55 |
| 2013/0151849 | A1 * | 6/2013 | Graham | .................. G06F 21/85 |
| | | | | 713/164 |
| 2017/0357253 | A1 * | 12/2017 | Kilpatrick | .......... G05B 19/0428 |
| 2019/0207944 | A1 * | 7/2019 | Caffrey | ................. H04L 63/101 |
| 2020/0076682 | A1 * | 3/2020 | Bernat | ................ H04L 41/0896 |

FOREIGN PATENT DOCUMENTS

| | | |
|---|---|---|
| EP | 2924569 A2 | 9/2015 |
| EP | 2924569 A3 | 7/2016 |
| EP | 3506594 A1 | 7/2019 |
| WO | 2017121928 A1 | 7/2017 |

OTHER PUBLICATIONS

IEEE; "IEEE Standard for an Architectural Framework for the Internet of Things (IoT)"; Mar. 10, 2020; 269 Pages.
Namur Recommendation NE 175; "NAMUR Open Architecture Concept"; Jul. 9, 2020 Edition; Dec. 1, 2016; Retrieved from Internet Feb. 6, 2024; 1 Page.

* cited by examiner

*Primary Examiner* — Hieu T Hoang
(74) *Attorney, Agent, or Firm* — Greenberg Traurig, LLP

(57)                ABSTRACT

A method of executing a request to an industrial control system, which runs in a protected domain and is configured to control one or more field devices. Each step of the method is to be executed on processing resources of a cloud domain (CD), an edge domain (ED) or the protected domain. According to the first aspect, a step of receiving, from a client, a message with a request containing logical actions and a step of authenticating the client are performed using CD resources. Next, a step of initiating a verification of the message and a step of checking whether the authenticated client is authorized to perform the logical actions are performed using ED resources. Then, a step of mapping the logical actions to physical actions and a step where the industrial control system is caused to execute the physical actions are performed using resources in the protected domain.

19 Claims, 6 Drawing Sheets

INTERFACE FOR A CORE PROCESS CONTROL SYSTEM

TECHNICAL FIELD

The present disclosure relates to the field of industrial process control. In particular it provides an interface for a core process control system and a method for executing a request to a core process control system.

BACKGROUND

NAMUR Recommendation NE 175 "NAMUR Open Architecture Concept" (edition 2020-07-09) discloses the NAMUR Open Architecture (NOA). This architecture was conceived for process control applications where field devices are monitored and controlled over a first communication channel by a control system. The NOA, which is illustrated in FIG. 2, includes an interface 281 from a Monitoring and Optimization (M+O) domain to the Core Process Control (CPC) domain, to which the control system belongs, as well as a second communication channel 281 from the field devices to the M+O domain. It is specified in NE 175 that the second communication channel 281 shall be diode-like: there shall be no feedback into the CPC domain when data is read out from the field devices. This is oftentimes a critical issue in terms of plant availability and automation security. The NOA furthermore foresees a Verification of Requests (VoR) mechanism 270 to ensure that only verified requests are forwarded from the M+O domain to the CPC domain. Such a VoR mechanism 270 provides a safe and reliable return path from the M+O domain to the CPC domain.

In more detail, the VoR mechanism has both a functional role (for example, a plausibility check of requests) as well as a security role (for example, authentication of a certain M+O application granting its request to send information to a certain CPC system). The security role is important in that some server interfaces, including OPC Classic of OPC UA server, may allow external clients to write values to CPC variables, which could have considerable effects on the controlled industrial process. Moreover, the external clients could disrupt the functioning of the server by generating excessive load on the server interfaces, namely, by issuing a large number of write calls; the server is normally required to react to each write call due to the client-server characteristics of the interface. Another scenario that justifies the VoR mechanism is inconsistencies relating to the internal address space of the server, which may be partially unknown to the external client. Further still, in basic implementations, the operators who control the industrial process using the CPC system lack a modality for reviewing, approving or rejecting the actions taken by the external clients using the write interface. To summarize, the actions of the external clients could lead to stability, security and reliability issues in the CPC system, which in turn makes it more expensive and complicated to develop, commission and/or manage such software applications that use the CPC system for interacting with the process and for performing operations management.

NOA leaves it up to implementers how to achieve the specified functionalities, and it is expected that the implementations will include innovative solutions. In particular, no implementation that supports the described VoR mechanism 270 is disclosed in the NAMUR Recommendations series.

SUMMARY

In the context of an industrial control system that runs on processing resources in a protected domain and is configured to control one or more field devices, it is an objective of the present disclosure to make available a method for executing a request to the industrial control system. It is a further objective to make available such a method that complies with some or all requirements of the NAMUR Open Architecture, including the plausibility check and/or the authentication. It is a further objective to make available such a method that is suitable for executing a request to write values to control system variables in the industrial control system. It is a further objective to execute the request in such manner that later auditing is facilitated. A still further objective of the present disclosure is to ensure high computational efficiency and strengthen the reliability.

At least some of these objectives are achieved by the invention as defined by the independent claims. The dependent claims relate to advantageous embodiments.

In a first aspect, there is provided a method of executing a request to an industrial control system, wherein the industrial control system runs in a protected domain and is configured to control one or more field devices. Each step of the method is to be executed on processing resources of a cloud domain (CD), an edge domain (ED) or the protected domain. It is understood that the CD and ED resources are separate from those of the protected domain. According to the first aspect, a step of receiving, from a client, a message with a request containing logical actions and a step of authenticating the client are performed using CD resources. Next, a step of initiating a verification of the message and a step of checking whether the authenticated client is authorized to perform the logical actions are performed using ED resources. Then, a step of mapping the logical actions to physical actions and a step where the industrial control system is caused to execute the physical actions are performed using resources in the protected domain. The mapping of the logical actions to physical actions can be performed subject to pre-specified rules. The physical actions can include writing a value to a variable of the industrial control system.

In broad terms, the CD is configured for location-agnostic allocation of processing resources, whereas the ED is configured for proximity-aware allocation of processing resources. The ED processing resources may be located such that the intended user is expected to enjoy a reasonable QoS in normal conditions, e.g., there exist at least one connection between the intended user and the ED processing resources which normally fulfils a minimum throughput, a maximum latency, or similar requirements. As such, some resources in the CD may qualify as ED resources because they are close to an intended user in the form of the industrial control system and/or the production plant and/or another relevant component. In most processor networks, except for the smallest and simplest ones, it is generally not possible to identify a universal ED resource—one which is close to all relevant components—but different components may have different ED resources, or none at all.

Thanks to the division of tasks between the CD, ED and CPC resources according to the method of the first aspect, the requested logical actions can be processed safely yet efficiently. In particular, the computationally rather light action of receiving the message is performed in the CD, i.e., in a centralized fashion. The CD is also a suitable resource to use for the authentication step because the identity of the client is an inherent property, which may be expected to change very rarely or never. The subsequent message verification and the authorization step are more advantageous to perform close to the industrial control system, that is, at least in part on processing resources which act as an ED relative to the industrial control system. Especially, the authorizations in force can be updated on short notice, which makes it preferable to refer to a single central authorization list rather than maintaining a large number of local copies. In a concrete scenario, an authorization may need to be revoked immediately when a malicious attack has been unveiled.

In some embodiments, the external client is provided with least one feedback message indicating the progress of the execution of the client's request to the industrial control system.

In some embodiments, a publish/subscribe arrangement is used to convey the message with the request from the edge domain to the protected domain. A publish/subscribe service is characterized by an asynchronous message exchange, in the sense that the receiving side may receive the message at a time independent of, and possibly much after, the time when the sending side posts the message. The publish/subscribe service may furthermore be characterized by a greater decoupling of the sending and receiving sides than in communication according to conventional unicast or broadcast transmission, which is initiated by the sending side, as well as message polling initiated by the receiving side.

In some embodiments, the industrial control system is caused to issue audit messages when it executes the physical actions. The audit messages are suitable for use in contemporaneous or later auditing, including auditing by a third party.

In a second aspect of the present disclosure, there is provided a processor network which includes: a protected domain (CPC) including processing resources to host an industrial control system configured to control one or more field devices; a cloud domain (CD) including processing resources separate from the protected domain, which are configured to receive from a client a message with a request containing logical actions and to authenticate the client; and an edge domain (ED) including processing resources separate from the protected domain, which are configured to initiate a verification of the message and a check whether the authenticated client is authorized to perform the logical actions. The processing resources of the protected domain are further configured to map the logical actions to physical actions subject to pre-specified rules, and to cause the industrial control system to execute the physical actions.

The processor network according to the second aspect generally shares the above-described advantageous of the method according to the first aspect. Similar to this method, it can be implemented in a variety of ways.

The present disclosure further relates to a computer program containing instructions for causing a computer, or the controller in particular, to carry out the above method. The computer program may be stored or distributed on a data carrier. As used herein, a "data carrier" may be a transitory data carrier, such as modulated electromagnetic or optical waves, or a non-transitory data carrier. Non-transitory data carriers include volatile and non-volatile memories, such as permanent and non-permanent storage media of magnetic, optical or solid-state type. Still within the scope of "data carrier", such memories may be fixedly mounted or portable.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order they are presented, unless this is explicitly stated.

BRIEF DESCRIPTION OF THE DRAWINGS

Aspects and embodiments are now described, by way of example, with reference to the accompanying drawings, on which.

DETAILED DESCRIPTION

The aspects of the present disclosure will now be described more fully hereinafter with reference to the accompanying drawings, on which certain embodiments of the invention are shown. These aspects may, however, be embodied in many different forms and should not be construed as limiting; rather, these embodiments are provided by way of example so that this disclosure will be thorough and complete, and to fully convey the scope of all aspects of the invention to those skilled in the art. Like numbers refer to like elements throughout the description.

Figure 1:
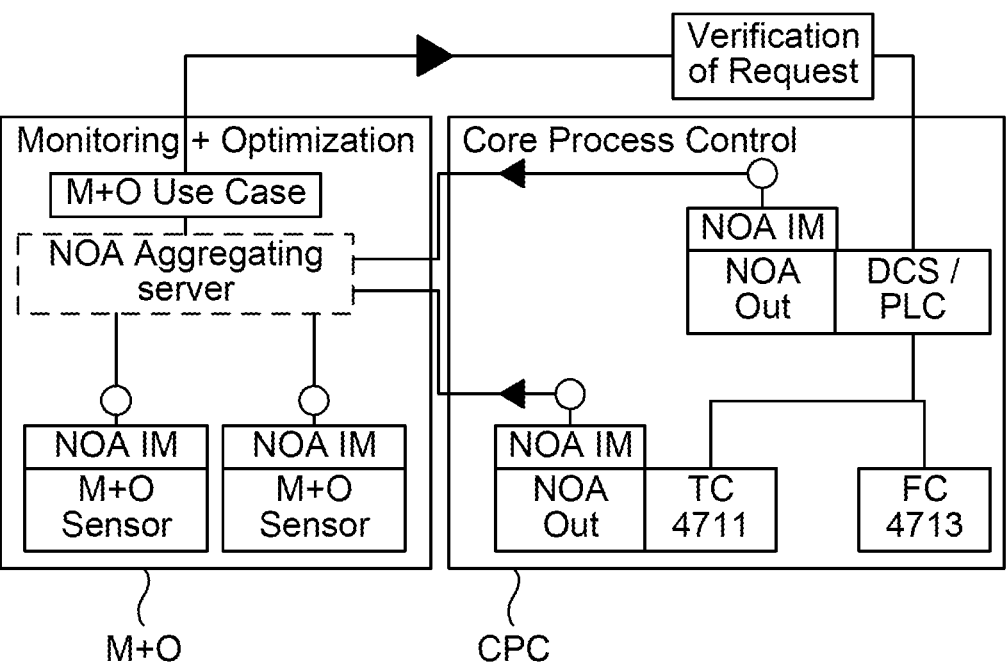
FIG. 1 is a simplified block diagram illustrating an NOA-type architecture which includes the Monitoring and Optimization (M+O) domain and the Core Process Control (CPC) domain, as well as data interfaces between these.

FIG. 1 is a diagram illustrating the main building blocks of the NAMUR Open Architecture (NOA) which is specified in the above-identified reference NE 175. The architecture includes a Monitoring and Optimization (M+O) domain and a Core Process Control (CPC).

The CPC domain is responsible for reliable and deterministic operation of a technical system, such as a production plant or another plant. The CPC domain encompasses the systems in place in level 1 and 2 of the traditional automation pyramid: field instrumentation, process analyzers, electrical equipment etc. on level 1 and basic automation systems on level 2. In FIG. 1, the level-1 components include the two field devices "TC 4711" and "FC 4713". The level-2 components are represented by the block "DCS/PLC" (Distributed Control System/Programmable Logic Controller) for the automation systems. These systems run in a deterministic way and the communication between the components within the CPC domain is mostly based on proprietary interfaces. For the communication between the level-1 and level-2 components, many different technologies can be used, including the following examples: 4-20 mA signaling with and without HART™ (Highway Addressable Remote Transducer), fieldbus communication like Foundation Fieldbus or PROFIBUS™, wireless technologies like wireless HART. The core tasks of the Core Process Control domain can be summarized as follows:

to read out the measurement signals from all field instruments, relevant for the operation of the plant, in real-time;

to control all actuators of the plant in real-time;

to execute basic control functions, like P/PI/PD/PID controllers from sensors (input signal) to actuators (output signal);

to execute sequential and batch functionalities;

to ensure the safe operation and shutdown of the plant also in case of emergencies; and to provide an efficiently aggregated HMI for the plant operators.

The systems within the CPC domain allow the operation of the plant even if all communication with the additional Monitoring and Optimization domain is disabled.

The M+O domain collects additional functionalities and applications that can add value to the industrial process, but that are not needed for the actual core automation of the plant. According to the NAMUR recommendations, it is expected that the NOA will permit a differentiation of requirements between the CPC and the M+O domain, thereby creating an area for fast adaptation of new innovative applications without conflicting with the existing, more stringent requirements of classical automation functions.

Besides enabling the access to additional data from existing CPC sensors and actuators, NOA also offers room within the M+O domain for additional sensors to extract additional information from plants. Such sensors will typically be based on non-invasive measuring principles, such as vibration measurements, so that they can be easily installed in the plant without requiring a shutdown. Within the context of NOA, these sensors are thus called M+O sensors to clearly differentiate them from the field devices and process analyzers used within the CPC domain. Since the M+O sensors are generally not needed for core process control, they can follow other, less stringent requirements and as such, the NOA M+O domain is open to innovative solutions. A commercial driver for developing such solutions may be to achieve the best cost per information ratio for the M+O sensors, in terms of the combination of the sensor cost, the connectivity cost, the engineering cost, the construction cost, the commissioning cost and the maintenance and lifecycle cost. M+O sensors are preferably not to be used for CPC tasks as they are generally not designed to meet the criteria for core process control. The core tasks of Monitoring and Optimization can be summarized as follows:

execute monitoring and optimization functionalities with a direct plant relation, for example resource dispatching or advanced process control;

collect additional data via a second communication channel from existing assets (like field devices, process analyzers and electrical equipment) that are already connected to the CPC domain via their primary communication channel;

collect data from add-on M+O sensors as enabler for additional services, like for example Advanced Analytics;

generate and communicate command requests from monitoring and optimization to CPC domain; and provide basis for agile adoption of innovative solutions e.g. a Value Chain Simulator or a Reliability Center.

As further indicated in FIG. 1, the NOA includes an information model (IM) which enables easy sharing of information among the components and thus ensures interoperability. In particular, the NOA Information Model is expected to achieve flexible and non-proprietary communication between the elements within the NOA structure. It will then serve as an integrative information space for plant data. The use of a standardized information model may contribute to it that all M+O applications know which parameters to expect and in which form, sensibly without individual configuration effort. An Information Model useful for implementing the teachings disclosed herein is described in NAMUR Recommendation NE 176 "NAMUR Open Architecture—NOA Information Model". In FIG. 1, each M+O Sensor and each "NOA Out" device makes its data available in a format compliant with the NOA IM.

In FIG. 1, the data interface from the CPC domain to the M+O domain (second communication channel) is indicated by the two leftward arrows. As noted initially, this interface shall be diode-like: there shall be "no influence from the M+O domain on the CPC domain for data collection". In the interest of plant availability and automation security, it should be ensured that there is no feedback whatsoever from the second communication channel that could alter in any way the primary communication or systems, or to change anything about the device configuration parameters. The NOA Diode is functionally specified in detail in NAMUR Recommendation NE 177 "NAMUR Open Architecture—NOA Diode". Just like the NOA diode ensures that data can be read out of the CPC domain without feedback, the "Verification of Request" (VOR) functionality provides a safe and reliable return path from the M+O domain to the CPC domain. The M+O domain makes a request that is verified by the NOA VOR before it is forwarded to the industrial control system. The NOA VOR is functionally specified in NAMUR Recommendation NE 178 "NAMUR Open Architecture—NOA Verification of Request". It is recalled that one of the objectives of the present disclosure is to propose implementations of the VOR functionality that meet these specifications.

The role of the optional NOA Aggregating Server is to structure the data communication paths ("diodes") from the CPC domain towards the M+O applications, so that the M+O application see only one interface, independently of the number of different data communication paths. Thus, it makes the information retrieval for the M+O apps easier, since it is sufficient to connect to the single NOA Aggregating Server—rather than the full number of diodes—since the NOA Aggregating Server holds all information coming from both the CPC domain as well as the M+O sensors. The NOA Aggregating Server is not mandatory in order for a solution to be a NOA solution. It is perfectly conceivable to have one data source from the CPC domain connecting to an M+O application without a NOA Aggregating Server. However, as soon as several data communication paths are established and information from CPC domain and the M+O domain is combined, as shown in FIG. 1, the NOA Aggregating Server may add value in the sense that it reduces the complexity of connecting all data sources with all M+O applications. Alternatively (not shown), an upstream NOA Aggregating Server is provided in the CPC domain, where it collects the data flows from the "NOA Out" components and provides an aggregated data flow to a downstream NOA Aggregating Server in the M+O domain. An NOA Aggregating Server useful for implementing the teachings disclosed herein is described in NAMUR Recommendation NE 179 "NAMUR Open Architecture—NOA Aggregating Server".

Figure 2:
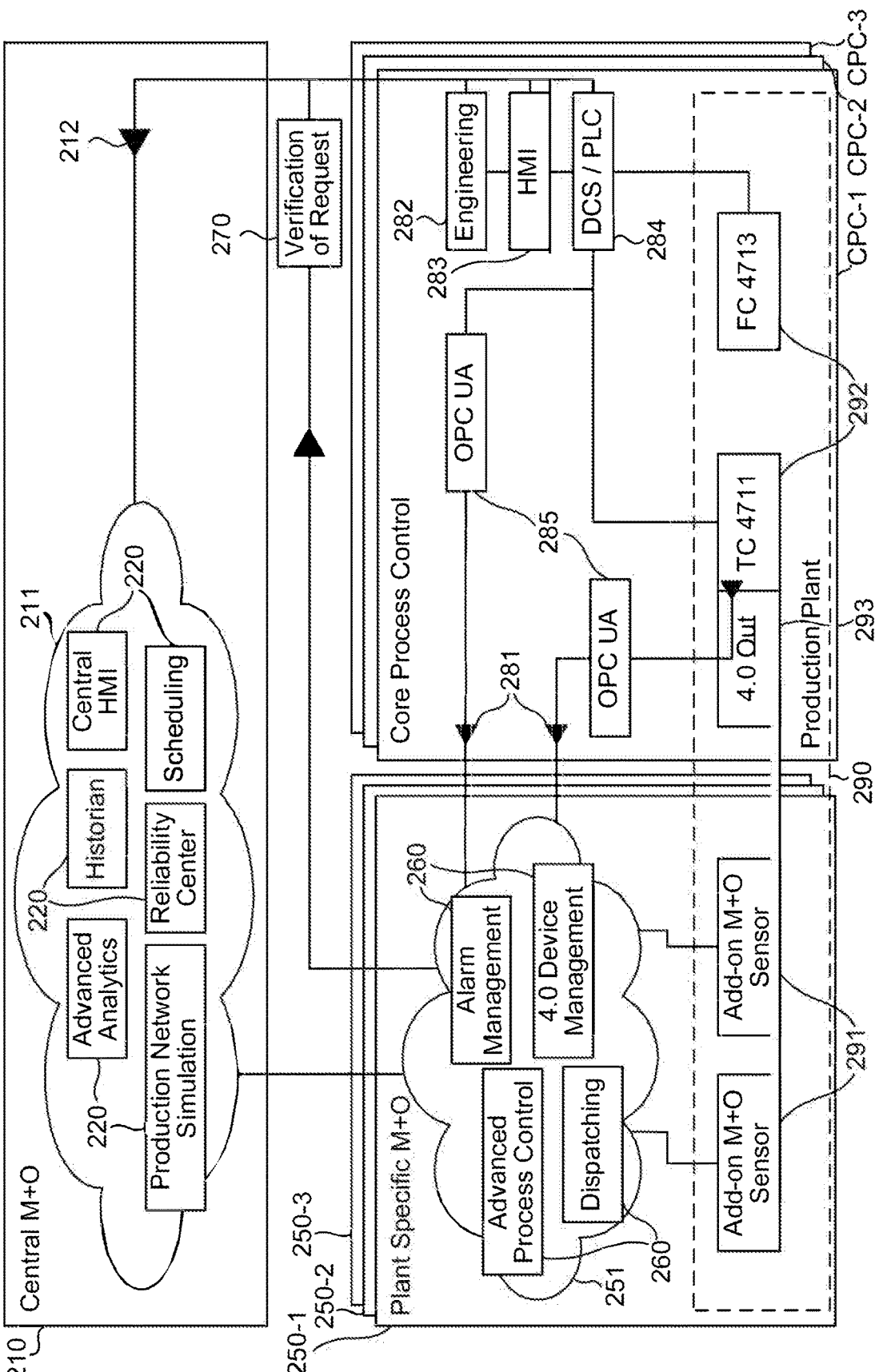
FIG. 2 is a more detailed block diagram illustrating an NOA-type architecture which includes a multi-part M+O domain and a corresponding number of CPC domains, which reflects a use case that involves a number of industrial control systems with multiple active field devices in each.

Turning to FIG. 2, there will now be considered a use case that involves a number of industrial control systems with multiple active field devices in each. The industrial control systems may be located in one or more production plants 290 or other industrial facilities. It is seen that, unlike the architecture in FIG. 1, the M+O domain is divided into a Central M+O domain (or subdomain) 210 and a number of Plant-Specific M+O domains (or subdomains) 250. Each Plant-Specific M+O domain 250-*k* is associated with a corresponding Core Process Control domain CPC-k. The Plant-Specific M+O domains may be in a one-to-one relationship with the Core Process Control domains, notably concerning the data interfaces therebetween.

It is expected that implementers will populate the Plant Specific M+O domain 250 with functions 260 that are relevant for the individual production plant 290 only. In other words, the functions tend to be located in the plant and directly connected to the plant's CPC domain and to sensors in the plant. The functions 260 can be implemented as applications (apps) executing on an app platform 251. The M+O Sensors 291, which were introduced above with reference to FIG. 1, can be located in one of the Plant-Specific M+O domains 250. The Central M+O domain 210, for its part, is suitable for monitoring and optimization functions 220 which are relevant for several plants 290 within one enterprise. They allow central monitoring of different production plants 290 and central optimization. The functions 220 can be implemented as apps executing on an app platform 211 in the Central N+O Domain 210. The Central M+O functions 220 are in general connected to the plant-specific M+O functions 260. Expressed differently, the Plant-Specific M+O domain 250 contains operation-related applications and services 260, such as advanced process control or alarm management, whereas the Central M+O domain 210 covers cross-system applications and services 220, such as a reliability center where monitoring of specific assets occurs across all plants 290 or platforms for advanced analytics for predictive maintenance applications.

As mentioned in the description of FIG. 1, it is foreseen according to the NOA Architecture that the CPC domain can contain the level-1 components, such as two field devices ("TC 4711", "FC 4713") 292, and level-2 components, such as the industrial control system ("DCS/PLC") 284, operator station ("HMI") 283 and engineering stations 282. The engineering stations 282 may be workstation or servers with functionalities for configuring the DCS, such as defining control applications, defining interactive process images, configuring field devices 292 and the like. Each field device 292 can optionally be associated with an interface (or interpreter) ensuring compliance with a protocol or an information model, such as the NOA IM or Plattform Industrie 4.0 ("4.0 Out").

At least the following data flows in the NOA are foreseen:
1. From CPC systems to Plant-Specific M+O. This data flow is in accordance with the OPC Unified Architecture (UA) 285, as functionally specified in IEC 62541-1 (2016). The OPC UA may be supplemented by—or embedded in—the NOA Information Model discussed above. Upstream of the beginning of the OPC UA 285, the data may have an arbitrary format, such as a proprietary format. This data flow shall proceed over a diode-like interface 281 that prevents feedback.
2. From field devices 292 to Plant-Specific M+O. NOA also establishes the concept of a second communication channel for field devices 292, including legacy field devices that are already connected to the CPC systems 282, 283, 284. These include field sensors and actors (actuators) as well as process analyzers, electrical equipment (like motor control centers, variable-speed drives, uninterrupted power supply, heat tracing) and the like. This data flow too may be in accordance with OPC UA 285 and it shall proceed over a diode-like interface 281. It is noted that, if the CPC domain has the information (for example, in an asset management tool) and can provide the information via the open interface in the format of the NOA Information Model, this enables the running of the same set of M+O applications 260.
3. From M+O Sensors 291 to the M+O applications 220. This data flow can be treated as an internal data flow. Generally speaking, data can be sent back and forth between plant-specific and central M+O as needed, without restriction. The preferred protocol for this communication is OPC UA. This communication allows central M+O applications 220 to add information to plant-specific M+O data models in the plant-specific applications 260. Vice versa, central M+O applications 220 can be fed with data from the plant-specific applications 260. This communication normally does not impose any risk on the CPC systems, because the NOA diode 281 ensures the separation between CPC and M+O for each plant 290. Preferably, the M+O sensors 291 shall not be connected to the CPC domain as they do not fulfil CPCs requirements. Rather, it is recommended that the infrastructure needed to connect the M+O sensors 291 to the M+O applications 220, such as a gateway to aggregate the signals from the M+O sensors 291, be separated from the CPC infrastructure on level 1 and level 2 with the possibility to have shared infrastructure (e.g., a network switch) on level 3. In this way, the M+O sensors 291 are isolated from the CPC domain and cannot influence it directly.
4. From the M+O domain 250 to the CPC domain. In addition to the read access from the CPC domain to the M+O domains, NOA may allow a secure path from the M+O domains back into the CPC domain. For example, this would allow setpoint values from advanced process control applications to be sent to the distributed control system 284 or a request for a configuration change of a field device 292 because an M+O application has proposed an improved device configuration under the given process conditions. To allow such feedback or write access from the M+O domains, a Verification of Request functionality 270 is provided. Its core task is to implement a secure and reliable flow of information from the M+O domains back into the CPC systems 282, 283, 284.
5. From the CPC systems 282, 283, 284 to the Central M+O domain 210. The data flow may proceed over a proprietary, not necessarily standardized interface 212. It is to be ensured that the M+O systems do not influence the CPC domain by means of this data flow, e.g. neither by changing setpoints nor in respect of IT security. In the NOA concept, this data flow into the central M+O may be said to represent the increasing need for the global integration of different existing Plant Information Management Systems (PIMS) for central applications 220, for example to enable centralized monitoring of specific asset types by a centralized expertise unit.

Concerning possible implementation options, the M+O domains can be implemented on processing resources in a cloud domain (CD) or an edge domain (ED) or a combination of these. The CD processing resources can be referred to as a cloud platform, and the ED processing resource can be referred to as an edge platform. The benefits of using edge circuitry may be more immediate for a Plant-Specific M+O domain 250 than for a Central M+O domain 210. The Plant-Specific M+O domain 250 can be implemented on processing resources arranged in (network-wise) proximity of the CPC domain, on which the industrial control system runs. In particular, the processing resources used by a Plant-Specific M+O domain 250 can be co-located with the production plant which the corresponding industrial control system controls, e.g., arranged on the same premises.

It is recalled that a CD is normally configured for location-agnostic allocation of processing resources; by contrast, an ED is generally speaking configured for proximity-aware allocation of processing resources. The ED processing resources may be located such that the intended user is expected to enjoy a reasonable QoS in normal conditions, e.g., the connection between the intended user and the ED processing resources fulfils a minimum throughput, a maximum latency, or similar requirements. As such, some resources in the CD may occasionally qualify as ED resources of a component because they are (network-wise) close to that component. The fulfilment of such QoS requirements in normal conditions can be achieved by placing the edge processing resources 150 suitably and/or by configuring network parameters related to routing, scheduling, resource allocation and traffic prioritization.

Figure 6:
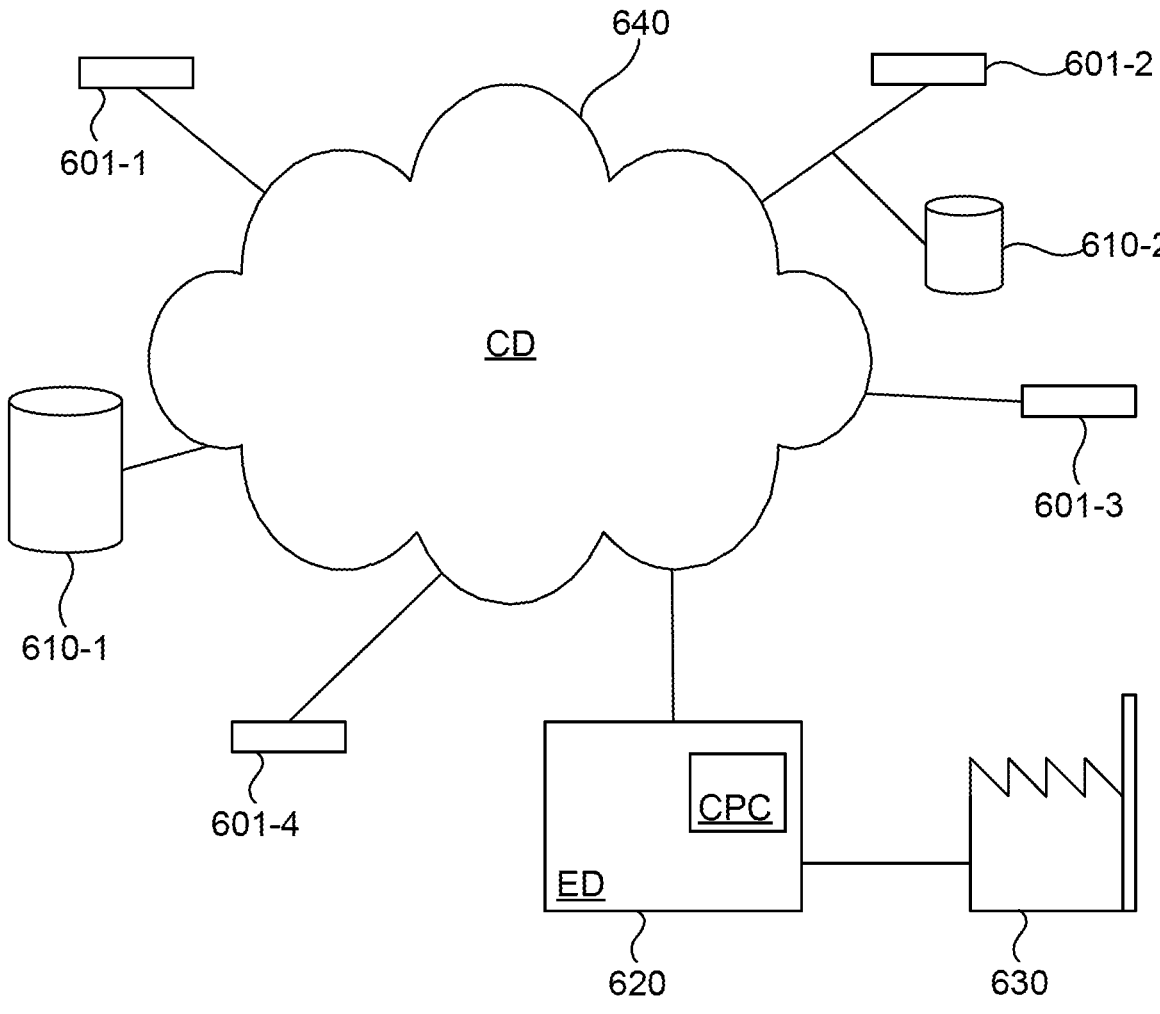
FIG. 6 is a simplified block diagram of a processor network according to embodiments herein.

To illustrate, FIG. 6 shows a wired or partially wireless processor network, in which the CD is implemented on a central processing resource 640, which interfaces with a plurality of devices acting as clients 601. The central processing resource 640 is central from the perspective of the network topology—it has connections to a majority of the important clients and servers in the network—but need not be geometrically or geographically central. Further, because the central processing resource 640 does not need to have a network connection compatible with the connection expected for edge resources (minimum throughput, maximum latency etc.), it can be located remotely. Two servers (or host computers) 610 are connected to the central processing resource 640. The servers may optionally include processing resources in addition to storage resources; in that case, the second server 610-2 could offer edge processing services to the second client 601-2, to which it has a direct and unencumbered network connection. Also connected to the central processing resource 640, as seen in the lower portion of FIG. 6, is a set of local processing resources 620, which act as an edge domain ED in relation to a production plant 630. The local processing resources 620 can be described conceptually as the processor network's 'edge' towards the plant 630. Here, a specially delimited and protected portion of the processing resources 620 acts as a protected domain, or CPC domain. The CPC domain is expected to offer a deterministic execution environment with a high availability and reliability. Although the ED could have some parts that run inside the CPC domain, there is in general no overlap between the ED and CPC domain; a technically more fitting metaphor could be that the ED acts as an intermediary—or connector—between the CPC domain and the CD.

Figure 3:
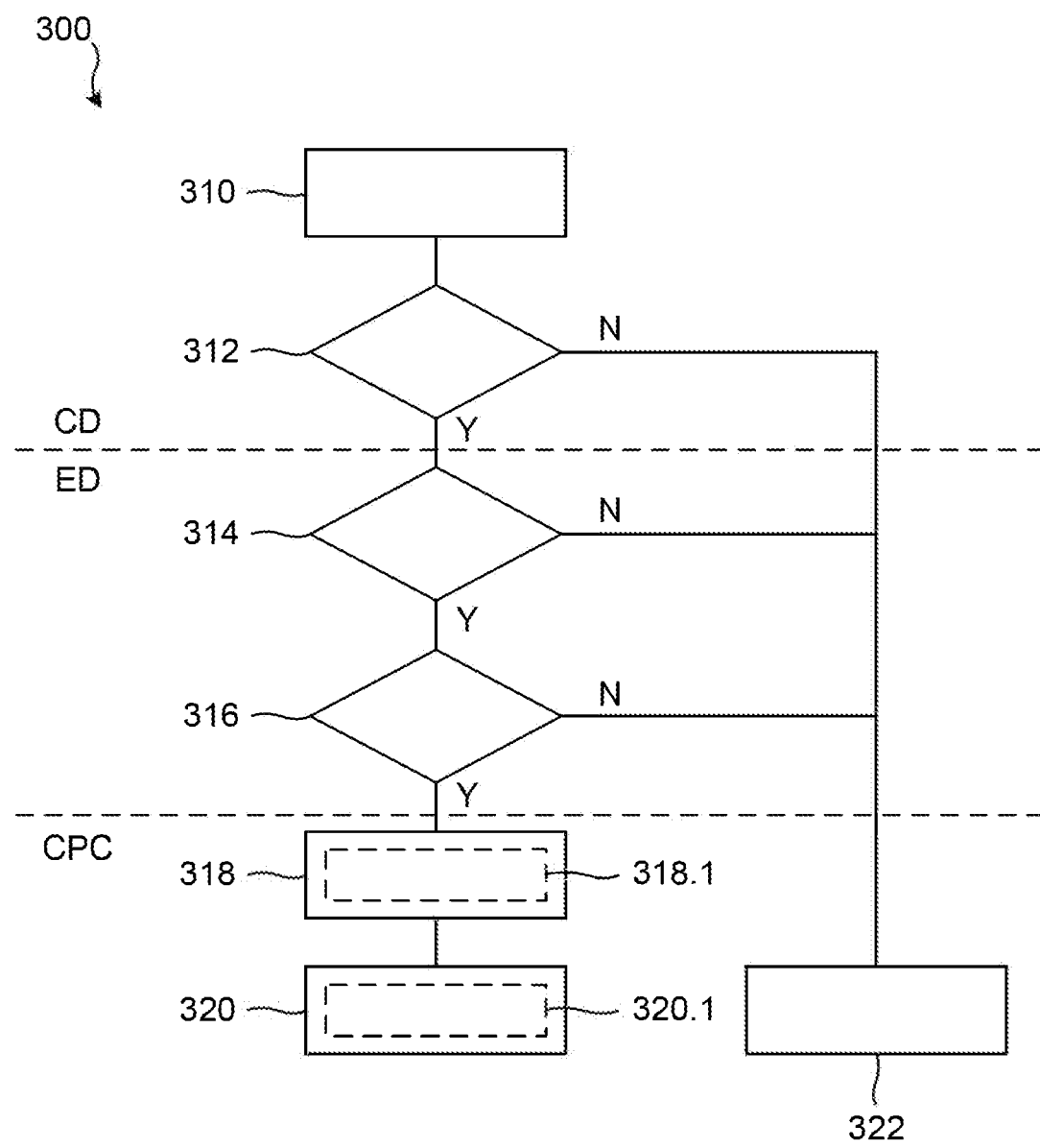
FIG. 3 is a flowchart of a method of executing a request to an industrial control system, in accordance with embodiments herein.

FIG. 3 is a flowchart of a method 300 of executing a request to an industrial control system of the type described and exemplified above. The method 300 is performed by means of a collaboration of the CD, ED and CPC. Alternatively, as will be discussed below with reference to FIG. 4, the method 300 may be performed by the CD and CPC.

According to the main embodiment of the method 300, steps 310 and 312 are performed by processing resources in the CD.

In the first step 310, a message with a request containing logical actions is received from a client 601. The message may be received over an exposed technology mapping interface, such as REST, OPC UA method, GraphQL or a similar interface.

In the second step 312, the client 601 is authenticated. The output of this step is a confirmed identity of the client 601, i.e., in terms of the device or its current user. Said client identity may be recorded on (e.g., added to) the request message; the request message with the added client identity may be digitally signed by the CD. The authentication may for example include a cryptographic identification process. Further, it may rely on inherited trust, such as a network user identity which is routinely established when the client connects or reconnects to the processor network, and which is deemed acceptable for the purposes of the present method 300. If the client 601 cannot be authenticated in step 312, the execution flow continues (N branch from step 312) to a decision 322 that the request cannot be carried out.

Provided that the authentication 312 of the client 601 is successful (Y branch from step 312), two subsequent steps 314 and 316 are performed by processing resources in the ED. Preferably, the CD makes the signed request message available to the ED, upon which the ED fetches it. The CD may alternatively transmit the signed request message to the ED.

In the third step 314, a verification process to be applied to the request message is initiated. According to the present embodiment, the verification process is initiated by making the signed request message available to processing resources in the CPC, in which one or more substantive verification actions are carried out. For example, a parameter value in the message may be compared with an expected parameter range, or the internal consistency of the content of the message (e.g., syntactic consistency, absence of irreconcilable parameter values) may be checked. If the conclusion of the verification process is positive, the execution flow continues to step 316 (Y branch from step 314) and the message can be digitally signed. If the verification is unsuccessful, the execution of the method 300 ends in decision 322, in which case the request cannot be carried out. The digital signature that indicates a successful verification is distinguishable from any digital signature that was added in step 312, e.g., by being generated using a different digital certificate.

In the fourth step 316, it is checked whether the client, which was authenticated in step 312, is authorized to perform the logical actions that are requested in the message. The authorization check may include a call to an exhaustive list of authorized clients; in some, more sophisticated implementations, the authorization list may instead be in the form of an attribute-based access control policy or a role-based access control policy. It is understood that an access control policy may define different sets of acceptable actions for different authorized users, with an optional additional dependence on environmental parameters, time of day, system status etc.

The authorization list may be deposited in the ED or the CPC, or in both of these. In other words, while step 316 is initiated in ED, it can be delegated in part to the CPC. In one example implementation, a master version of the authorization list is maintained in the CPC, and a copy (snapshot) of the authorization list is deposited in the ED, on a periodic or event-triggered basis. The system owner makes amendments to the master version, which are then propagated with some delay to the copy. In this example implementation, a possible authorization check proceeds in two stages: the client is first checked with respect to the copy of the authorization list in the ED and then, only if it passes the first check, it is checked with respect to the master version in the CPC. This avoids unnecessary calls to the master version in the CPC, yet provides an efficient way to dispose of clearly unauthorized requests.

Provided that the message verification 314 and authorization check 316 are successful (Y branch from step 316), two subsequent steps 318 and 320 are performed by processing resources in the CPC.

In the fifth step 318, the logical actions requested in the client's message are mapped to physical actions. The mapping may include a translation of functional-type requests (e.g., action to be performed on a workpiece, setpoint value for a physical characteristic of an industrial process) into structural-type requests (e.g., activation of specific hardware, such as a specific actuator, or activation of a control loop involving a specific sensor). The mapping may be performed subject to pre-specified rules. The pre-specified rules may include at least one constraint which is dependent on a current state of the industrial control system and/or a state of the field devices. This is to say, a requested setpoint value may be allowable to use if certain pre-specified conditions are fulfilled but unallowable otherwise; e.g., the load on a subsystem of the production plant shall not exceed a maximum value, the fill level of an additive tank shall not be below a minimum value.

When the physical actions have been determined by the mapping in step 318, they are forwarded to the industrial control system (e.g., in the form of mapping data). In a subsequent sixth step 320, the industrial control system is then caused to execute the physical actions. This may be achieved by applying the physical actions to an interface of the industrial control system.

As suggested by FIG. 3, the sixth step 320 may be the final one in a successful execution cycle of the method 300. At least some of the steps 310, 312 onwards may be repeated when a new request message is received. It may be optional to repeat the client authentication in step 312 if the requesting client has recently been authenticated; similarly, the authorization in step 316 can be dispensed with if the client has recently been found to be authorized without restrictions.

In some embodiments of the method 300, the request message is made available to the CPC by a sequence of independent modules which interact in accordance with a publish/subscribe (or publication-subscription, or PubSub) arrangement. The sequence of modules may be as shown in the message propagation scheme in FIG. 5:

a NOA VOR Connect module in the ED,
a VoR Broker module in the ED, and
a VoR Request Service in the CPC.

The modules may be implemented as software code and need not correspond to structural delimitations in the underlying processing resources. Under the alternative message propagation scheme in FIG. 4, the NOA VOR Connect module and VoR Broker module are implemented in the CD. Either way, the NOA VOR Connect module can be configured to be compliant with NOA specifications as regards the input and output interfaces and/or the scope of the substantive verification actions.

It is recalled that a publication-subscription service is characterized by asynchronous message exchange, in the sense that the receiving side may receive the message at a time independently of, and possibly much after, the time when the sending side posts the message. The publication-subscription service may furthermore be characterized by a greater decoupling of the sending and receiving sides than in communication according to conventional unicast or broadcast transmission, which is initiated by the sending side, and in message polling at the instance of the receiving side. Indeed, the sending side (publisher) may post messages to a storage that belongs neither to itself nor to the receiving side (subscriber) but is provided by an intermediary (e.g., middleware). In the context of publication-subscription services, such intermediary may be referred to as a broker or message broker. In implementations of the method 300, the message broker may be addressable as the VOR Broker module seen in FIG. 5.

Implementations of the publication-subscription arrangement according to the present disclosure may be compliant with the Data Distribution Service (DDS) standard or the Open Platform Communications Unified Architecture (OPC UA) PubSub protocol, or alternatively be compliant with specifications for the Network Exposure Function (NEF) Northbound Interface of 3GPP NR if a cellular connectivity framework is applied.

The publication-subscription service may be structured into topics or classifications. For the implementation of the publish/subscribe arrangement to be used in the method 300, the example topics Requests and Feedback may be defined. The NOA VOR Connect module can then instantiate a publisher in the Requests topic and a subscriber in the Feedback topic. Likewise, the VOR Request Service module can instantiate a subscriber in the Requests topic and a publisher in the Feedback topic.

In some embodiments of the method 300 the fifth step 318, in which the logical actions are mapped to physical actions, includes a substep 318.1 of issuing at least one feedback message addressed to the client 601. This keeps the client 601 updated about the progress of the processing of the request and about the substantive outcome of the logical-to-physical mapping. In embodiments, where the just described publish/subscribe arrangement is used, the feedback messages may be published in a dedicated topic (e.g., Feedback) of the publish/subscribe arrangement, from which the feedback messages can be retrieved by the client 601.

A further optional feature the method 300 is to have audit messages issued by the industrial control system when it executes the physical actions. Each of such audit messages indicates an action (or multiple actions) which have been executed by the industrial control system. The audit messages are stored in a dedicated auditing repository ("Audit" in FIG. 5), which has an acceptable degree of protection against unauthorized tampering, to be available for auditing. An aim of such auditing may be to determine authoritatively that the industrial control system has performed a certain physical action, or to determine authoritatively that a certain physical action has not been performed. The auditing may be performed at runtime or retrospectively. For runtime auditing, as shown in FIGS. 4 and 5, a publish/subscribe arrangement implemented by a sequence of two modules "DCS Connect" and "csconnect broker" (DCS Connect→Connect Module→csconnect broker→Message Broker) in the CD/ED and a module "Alarm&Event Publisher" in the CPC can be used.

Figure 4:
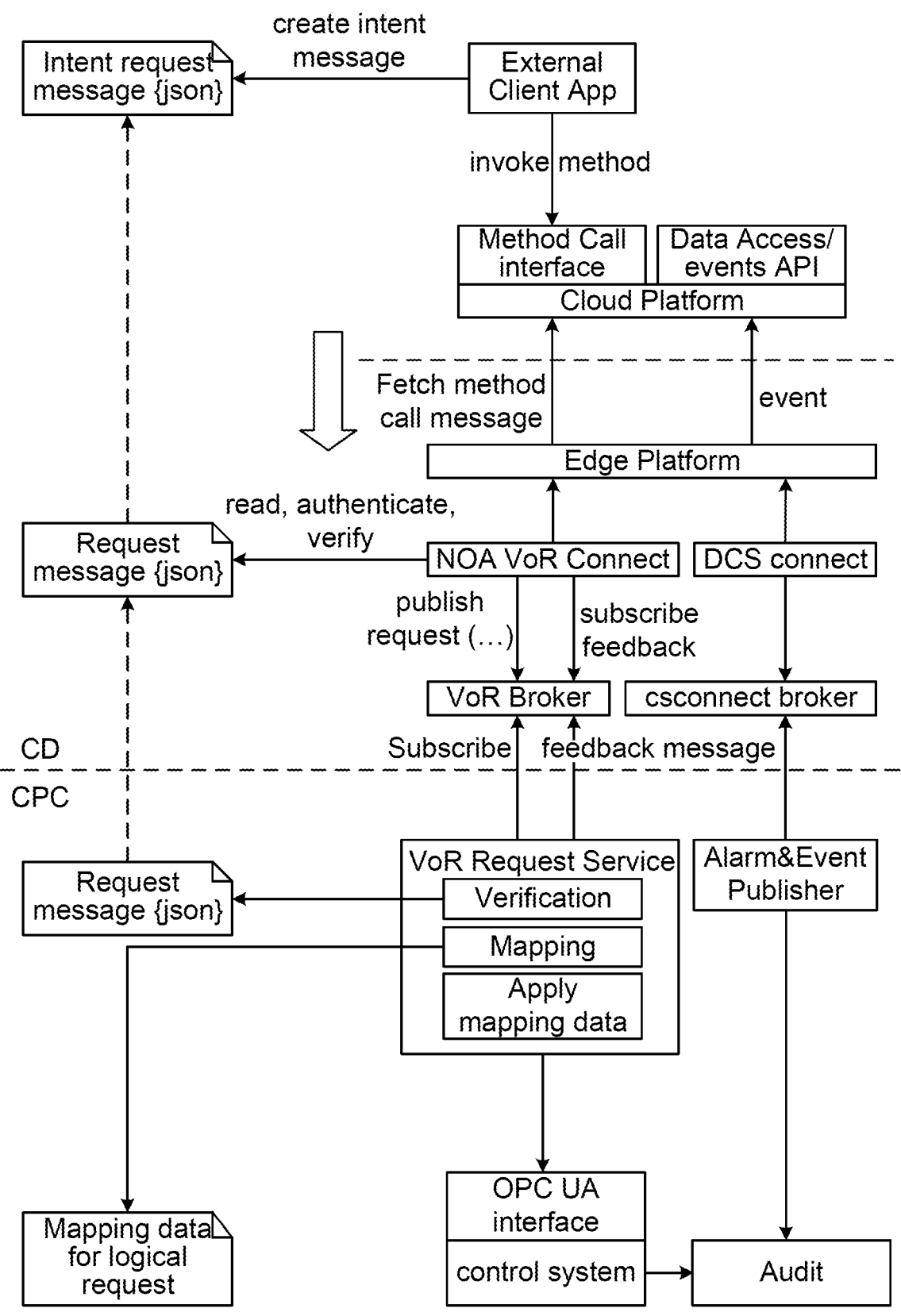
FIGS. 4 and 5 are an illustration of message propagation which may be taking place during the execution of a request to an industrial control system.
Figure 5:
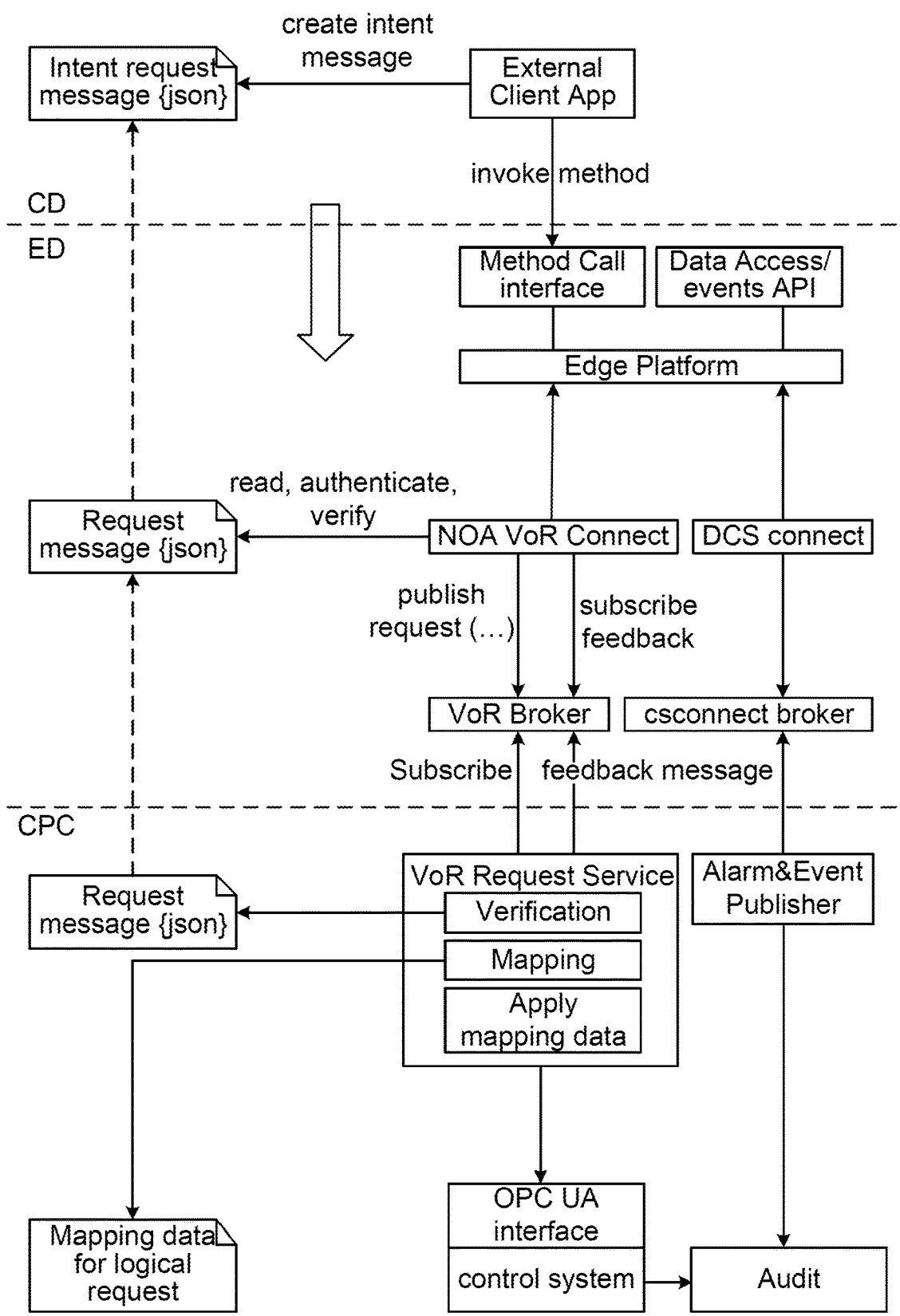

FIGS. 4 and 5, which have been occasionally referred to in the course of the foregoing description, depict message propagation schemes corresponding to two possible implementations—among many others—of the method 300. The division into CD, ED and CPC is indicated by dashed vertical lines. The rectangular boxes in FIGS. 4 and 5 represent functional modules, for example software modules for performing a specific function or hardware, using a formalism generally in line with that in FIG. 2. The stylized rectangular boxes resembling documents, on the left-hand side of FIGS. 4 and 5, represent messages. Transfer of data, reading of data, writing of data, and execution of operative commands are symbolized by dashed or solid arrows, some which carry explanatory labels. It is noted that the module "control system" refers to the industrial control system, which is to execute the physical actions obtained by the mapping in step 318, and may coincide with one or more of the CPC systems 282, 283, 284 seen in FIG. 2. The capabilities of the module "Alarm&Event Publisher", which may be active in auditing, may overlap or coincide with the M+O application "Alarm Management" 260 in FIG. 2. The modules "NOA VOR Connect", "VOR Broker" and "VOR Request Service" in FIGS. 4 and 5 may be regarded as a technical implementation of the Verification of Request functionality 270 in FIG. 2.

The aspects of the present disclosure have mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A method of executing a request to an industrial control system, wherein the industrial control system runs in a protected domain and is configured to control one or more field devices, the method comprising:

on processing resources in a cloud domain separate from the protected domain,
    receiving from a client a message with a request containing logical actions, and
    authenticating the client;
on processing resources in an edge domain separate from the protected domain,
    initiating a verification of the message, and
    checking whether the authenticated client is authorized to perform the logical actions;
on processing resources in the protected domain,
    mapping the logical actions to physical actions subject to pre-specified rules, and
    causing the industrial control system to execute the physical actions.

2. The method of claim 1, wherein said step of mapping the logical actions include issuing at least one feedback message addressed to the client.

3. The method of claim 1, wherein a publish/subscribe arrangement is used to convey the message with the request from the edge domain to the protected domain and/or to convey the feedback message from the protected domain to the edge domain.

4. The method of claim 1, wherein the verifying of the message includes at least one plausibility check, such as a verification in view of an expected parameter range or a verification of internal consistency.

5. The method of claim 1, wherein the mapping of the logical actions is performed subject to a pre-specified rule that includes a constraint dependent on a current state of the industrial control system and/or of the field devices.

6. The method of claim 1, wherein the physical actions to be executed by the industrial control system include writing a value to a variable of the industrial control system.

7. The method of claim 1, further comprising causing the industrial control system to issue one or more audit messages, each indicating an action executed by the industrial control system.

8. The method of claim 1, wherein the cloud domain is configured for location-agnostic allocation of processing resources.

9. The method of claim 1, wherein the edge domain is configured for proximity-aware allocation of processing resources.

10. A processor network, including:

hardware processing resources in a protected domain and configured to host an industrial control system configured to control one or more field devices;

hardware processing resources in a cloud domain that is separate from the protected domain, the cloud domain hardware processing resources being configured to receive from a client a message with a request containing logical actions and to authenticate the client; and hardware processing resources in an edge domain that is separate from the protected domain, the edge domain hardware processing resources being configured to initiate a verification of the message and check whether the authenticated client is authorized to perform the logical actions, wherein the protected domain hardware processing resources are further configured to map the logical actions to physical actions subject to pre-specified rules, and to cause the industrial control system to execute the physical actions.

11. The processor network of claim 10, wherein the edge domain and protected domain are connected through a publish/subscribe arrangement configured to convey the message with the request from the edge domain to the protected domain, wherein the edge domain implements a message broker within said publish/subscribe arrangement.

12. A computer program product comprising:

a non-transitory computer-readable storage medium; and instructions stored in the storage medium and configured to cause a processor network to perform a method of executing a request to an industrial control system, the processor network having:

a protected domain including processing resources to host an industrial control system configured to control one or more field devices;

a cloud domain including processing resources separate from the protected domain, which are configured to receive from a client a message with a request containing logical actions and to authenticate the client; and an edge domain including processing resources separate from the protected domain, which are configured to initiate a verification of the message and check whether the authenticated client is authorized to perform the logical actions, wherein the processing resources of the protected domain are further configured to map the logical actions to physical actions subject to pre-specified rules, and to cause the industrial control system to execute the physical actions, wherein the method comprises:

on the processing resources in the cloud domain separate from the protected domain,
    receiving from the client the message with the request containing logical actions, and
    authenticating the client;
on the processing resources in the edge domain separate from the protected domain,
    initiating the verification of the message, and
    checking whether the authenticated client is authorized to perform the logical actions:
on the processing resources in the protected domain, mapping the logical actions to the physical actions subject to the pre-specified rules, and causing the industrial control system to execute the physical actions.

13. The method of claim 2, wherein a publish/subscribe arrangement is used to convey the message with the request from the edge domain to the protected domain and/or to convey the feedback message from the protected domain to the edge domain.

14. The method of claim 2, wherein the verifying of the message includes at least one plausibility check, such as a verification in view of an expected parameter range or a verification of internal consistency.

15. The method of claim 2, wherein the mapping of the logical actions is performed subject to a pre-specified rule that includes a constraint dependent on a current state of the industrial control system and/or of the field devices.

16. The method of claim 2, wherein the physical actions to be executed by the industrial control system include writing a value to a variable of the industrial control system.

17. The method of claim 2, further comprising causing the industrial control system to issue one or more audit messages, each indicating an action executed by the industrial control system.

18. The method of claim 2, wherein the cloud domain is configured for location-agnostic allocation of processing resources.

19. The method of claim 2, wherein the edge domain is configured for proximity-aware allocation of processing resources.

* * * * *